United States Patent [19]

Thomson et al.

[11] 4,409,833

[45] Oct. 18, 1983

[54] DIAPHRAGM MANOMETER

[75] Inventors: Roger Thomson, Bayshore; Edward Weik, Williston Park, both of N.Y.

[73] Assignee: Petrometer Corporation, New Hyde Park, N.Y.

[21] Appl. No.: 295,110

[22] Filed: Aug. 21, 1981

[51] Int. Cl.[3] .............................................. G01F 23/16
[52] U.S. Cl. ...................................... 73/302; 73/299
[58] Field of Search ................. 73/302, 715, 716, 747, 73/744, 299; 137/558, 85, 403, 386; 60/593

[56] References Cited

U.S. PATENT DOCUMENTS

| | | | |
|---|---|---|---|
| 2,121,743 | 6/1938 | Oyen | 73/299 |
| 2,471,328 | 5/1949 | Jones | 137/403 |
| 2,628,500 | 2/1953 | Johnson | 73/299 |
| 2,791,119 | 5/1957 | Zinn et al. | 73/302 |
| 2,906,095 | 9/1959 | Whitehead | 60/593 |
| 3,729,997 | 5/1973 | Luke | 73/302 |
| 4,150,569 | 4/1979 | Verne | 73/302 |

Primary Examiner—Charles E. Frankfort
Assistant Examiner—David R. Schuster
Attorney, Agent, or Firm—Henry R. Lerner

[57] ABSTRACT

A system for measuring the level of liquid stored in deep tanks or vessels that allows the use of a lightweight, relatively non-toxic, non-corrosive gauge fluid of normal column height is disclosed. The system discloses a diaphragm manometer that alters a greater pressure from the tank liquid into a lesser pressure from the gauge fluid permitting such gauge fluid to be lightweight and making it unnecessary to use high density fluids which are usually toxic, contaminating and have other undesirable handling characteristics. The device can be used for open tanks, or, with adaptations, for sealed tanks. For open tanks, the device provides two sealed chambers having two opposing diaphragms. For sealed tanks, pressure neutralizing elements are added with one device providing three sealed chambers and two diaphragms with neutralizing connectors, and another providing three sealed chambers and three diaphragms.

15 Claims, 5 Drawing Figures

DIAPHRAGM MANOMETER

The subject invention relates to a system for measuring the liquid height of a stored liquid in a tank or vessel. The system is of the type having a means for supplying pressure at a pressure equal or proportional to the hydrostatic force exerted at the bottom of the tank by the stored liquid; and having a pressure gauging cylinder containing a column of gauging fluid that exerts a hydrostatic force at the bottom of the column.

In a conventional manometer tank liquid level gauging system, the column of gauging fluid which exerts a hydrostatic pressure is balanced directly against the hydrostatic pressure exerted by the tank contents. In such a system an open ended downpipe extending from the top of the tank through the stored liquid and terminating at a measured distance from the tank bottom is kept purged of liquid by a compressed gas, such as air or an inert gas, introduced to a gas transmission line by a purge device such as a bubbler, purge valve, or flow meter. The source of the compressed gas varies: a compressed air line, a separate compressor, or a hand pump. Hydrostatic pressure equal to the static head of the tank liquid is maintained in the downpipe due to the fact that excess air is bubbled out of the bottom of the pipe once the liquid contents of the downpipe have been purged. Conventionally, this pressure is transmitted to a rear leg, or well, of a manometer gas gauge. The gauge fluid is thus displaced proportionally to the depth of the tank liquid whereby the fluid level in the gauge cylinder can be read against the measuring indicia. In general, three factors govern the size, that is, the vertical height of the column fluid and the calibration of the gauging markings: the specific gravity of the tank liquid, the specific gravity of the gauge fluid, and the depth of the tank. Heavy fluids, such as mercury (specific gravity approximately 13.5) and the heavy bromides (specific gravity approximately 3) are used to keep the column of gauge fluid within reasonable limits, especially where the tanks involved are of substantial depth.

For the conventional system of the type described several inherent problems exist. These problems are as follows:

1. Gauge fluids are particularly liable to contamination from the compressed gas supply and from the tank product, particularly fumes.

2. Heavyweight gauge fluids are all toxic and corrosive and present a danger of contaminating the tank product either directly or by vapors.

3. Gauge fluids can be lost if the capacity of the manometer is exceeded. Although conventional manometers are normally equipped with a float type fluid check valve to prevent overflow loss, these check valves are subject to failure.

Manometers for measuring heights of liquids in, or associated with tanks and vessels are disclosed in U.S. Pat. No. 723,040, issued Mar. 17, 1903 to Schmitz; U.S. Pat. No. 1,261,262, issued Apr. 2, 1918 to Meredith, and British Pat. No. 183,719, issued Aug. 3, 1922 to Merrill. The above cited patents disclose various types of manometers that operate basically with the liquid to be measured exerting a first hydrostatic pressure directly against a diaphragm or piston that in turn exerts a force against a column of gauge fluid exerting a hydrostatic pressure.

SUMMARY OF THE INVENTION

In accordance with the subject invention, there is provided a diaphragm manometer which alters a greater hydrostatic pressure of a stored liquid in a tank into a lesser gauge fluid pressure by a predetermined ratio. This alteration of pressure allows the use of a lightweight, relatively non-toxic, non-corrosive gauge fluid for the column of gauge fluid for obtaining readings of the level of the stored liquid, since the height of the column can be kept to normal limits because of the pressure alteration which displaces the column to a level proportional to the altered pressure.

In accordance with such a system, there is provided a housing having opposite ends and a pair of opposed diaphragms secured to each other in fixed spaced relation provided in the housing. The diaphragms define with the housing a first chamber between the first of the diaphragms and one of the housing ends and a second chamber between the second of the diaphragms and the other of the housing ends. The means for providing a proportional pressure is connected to the first chamber. The altered pressure is transmitted from the second chamber to the column.

The second diaphragm is larger in area then the first diaphragm by the predetermined ratio. Thus, the proportional pressure provided to the first chamber is reduced to the altered pressure by said ratio. Further, the pair of diaphragms are rigidly secured to one another in fixed spaced relation by a member which moves the pair of diaphragms in unison relative to the housing in response to the porportional pressure exerted against the first diaphragm. Thus, the member transmits the proportional pressure from the first diaphragm to the larger second diaphragms, and the proportional pressure is reduced to the altered pressure in the second chamber.

The system is adapted to a tank having an overliquid portion sealed from the atmosphere exerting a positive or negative overliquid pressure relative to atmospheric pressure as follows. The first and second diaphragms described above define with the sides of the housing a third chamber positioned between the first and second chambers. A sealed gauge overfluid portion is provided at the top of the column of gauge fluid. The overliquid portion of the tank is connected to both the third chamber and to the gauge overfluid portion. Thus, the overliquid pressure is neutralized and the column of gauge fluid is displaced to a level allowing a direct reading corresponding to the level of liquid in the tank.

A second embodiment is provided to deal with the arrangement in which there is a sealed tank overliquid portion. A housing having opposite ends with three diaphragms secured to one another in fixed spaced relation provided in the housing is disclosed. The diaphragms define with the housing a first chamber between the first of the diaphragms and one of the housing ends, a second chamber between the second of the diaphragms and the other of the housing ends, and a third chamber defined by the third of the diaphragms, the second diaphragm, and the sides of the housing. The third diaphragm is positioned between and opposed to the first and second diaphragms. The means for providing a proportional pressure, which includes the overliquid pressure, is connected to the first chamber and the altered pressure is transmitted from the third chamber to the column. The overliquid pressure is transmitted from the tank overliquid portion to the third chamber. Thus, the overliquid portion is neutralized and the column is displaced to a level allowing a direct gauge reading corresponding to the level of liquid in the tank. In this embodiment, the first and second diaphragms are equal in area, and the third diaphragm is larger in area than the first and second diaphragms by the predetermined ratio. Thus, the proportional pressure provided to the first chamber is reduced by the ratio to the altered pressure in the third chamber. In addition, the three diaphragms are ridigly secured to one another in fixed spaced relation by a member which moves the three diaphragms in unison relative to the housing in response to the proportional pressure exerted against the first diaphragm.

The system also provides a stop means for limiting the quantity of gauge fluid displaced from the second member in the main embodiment described above and from the third chamber in the last embodiment described.

The system also provides an overflow reservoir means provided at the top of the column of gauge fluid for receiving excess gauge fluid.

DESCRIPTION OF THE PREFERRED EMBODIMENT

Figure 1:
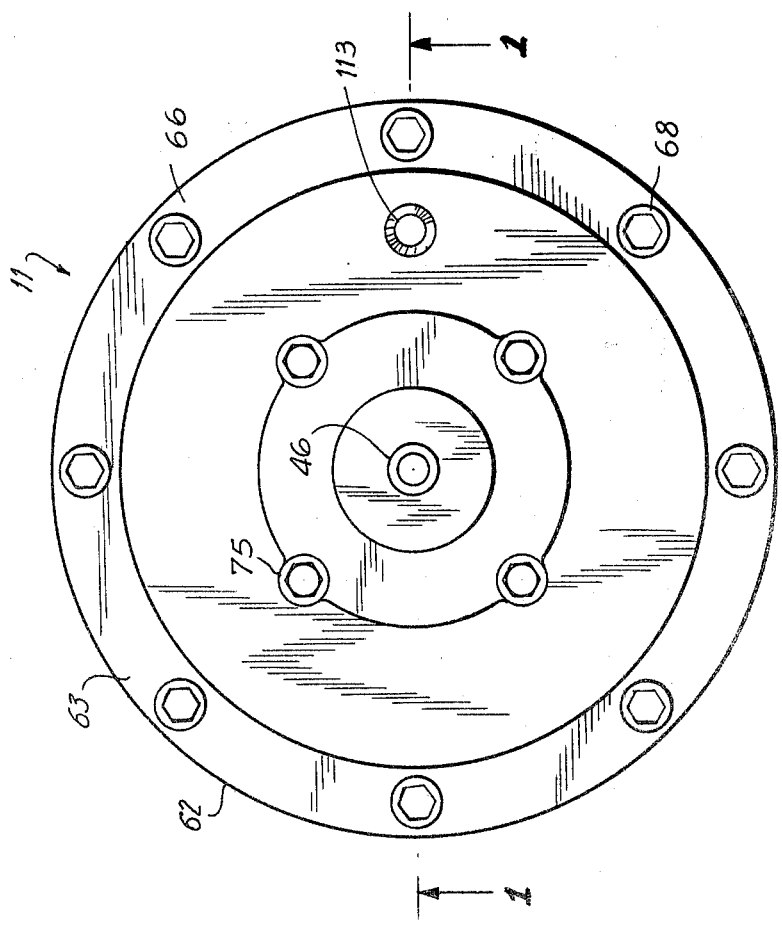
FIG. 1 is a top view of the pressure converting device.
Figure 2:
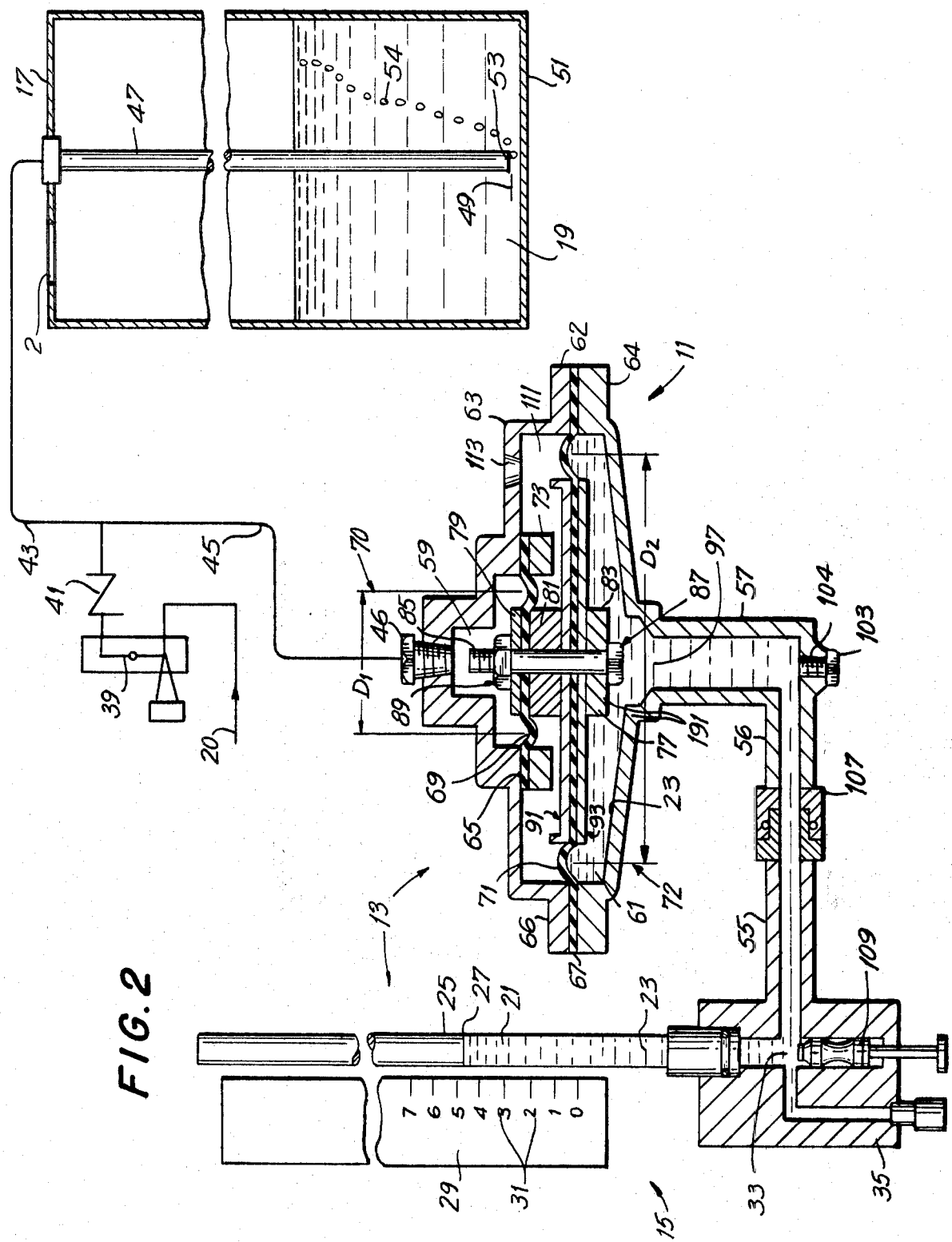
FIG. 2 is a schematic view of the system of the present invention including a cross-sectional side view of the pressure converting device taken along the line 1—1 in FIG. 1; the pressure gauging cylinder with the column of gauge fluid; the gas supply means; and the tank with its stored liquid.

With reference to FIG. 1, a top view of pressure converting, or altering, device 11 of the subject invention is illustrated. A schematic view of the apparatus 13 of the subject invention is illustrated in FIG. 2 and shows a side view of device 11 along with pressure gauge 15 as a part of the entire measuring system including pressurized gas supply source 20 and tank 17 containing stored liquid 19. Pressure gauge 15 includes column 21 of indicating, or gauge, fluid 23 contained in glass cylinder 25. Gauge fluid level 27 can be observed through the glass cylinder and measured against measuring portion 29 with indicia 31 situated to read changes in level 27. Column 21 exerts a gauge fluid hydrostatic pressure at column bottom 33 in gauge support block 35.

Stored liquid 19 exerts a second hydrostatic pressure at the bottom of tank 17 having aperture 2 open to the atmosphere. Compressed gas supply means 20, which can be obtained from such sources as a compressor, a general compressed gas system, or a hand pump, is first directed through air flow indicator 39 and check valve 41 into gas transmission lines 43 and 45. Line 43 is connected at the top of tank 17 to open-ended gas downpipe 47 to a measured distance 49 from tank bottom 51. Compressed gas supply 20 provides a compressed gas, which can be air or any inert gas, down through the downpipe purging it of stored liquid 19 until gas bubbles 54 are ejected from bottom exit 53. At this time the pressure of the compressed gas in gas downpipe 47 and line 43 stabilizes or plateaus to a steady pressure once liquid has been purged from the downpipe and no further change in pressure occurs until such time as the height of stored liquid in the tank increases or decreases. The pressure of the compressed gas is equal to the hydrostatic pressure of the stored liquid at open end 53 of the downpipe. The pressure in line 45 being the same as that in line 43, the compressed gas supplied to device 11 is at the hydrostatic pressure exerted at bottom exit 53 of the downpipe. For purposes of this discussion, the hydrostatic pressure exerted at exit 53 represents the hydrostatic pressure exerted by the height of liquid 19 in the tank, it being understood that distance 49 between the bottom of the tank and exit 53 must be taken into account when calibrating gauge 15.

Simultaneously, gauge fluid 23 is directed from device 11 via vertical pipe 57, horizontal gauge fluid transfer pipes 56 and 55 to glass column 25 rising to gauge fluid level 27. Thus, device 11 has the hydrostatic pressure of the gauge fluid delivered to it on one side and the hydrostatic pressure of the stored liquid via the compressed gas on the opposite side. Because, according to the subject invention, the fluid used as a gauging fluid is lightweight, the hydrostatic pressure exerted on the gauge fluid side of device 11 is considerably less than the hydrostatic pressure exerted on the compressed gas on the other side of the device.

In accordance with the present invention device 11 is constructed and arranged to act as a pressure altering device that translates the greater pressure of the compressed gas and the lesser pressure of the gauge fluid into two equal and opposed forces that will balance and so reflect the current depth of stored liquid in the tank by means of the fluid level of the gauging column. Alternatively, device 11 can be described as providing means for reducing greate tank liquid pressure to lesser gauge fluid pressure. Also, it provides means for increasing the lesser gauge liquid pressure to the greater tank liquid pressure. Thus, a lightweight gauge fluid of normal column height is possible.

Figure 3:
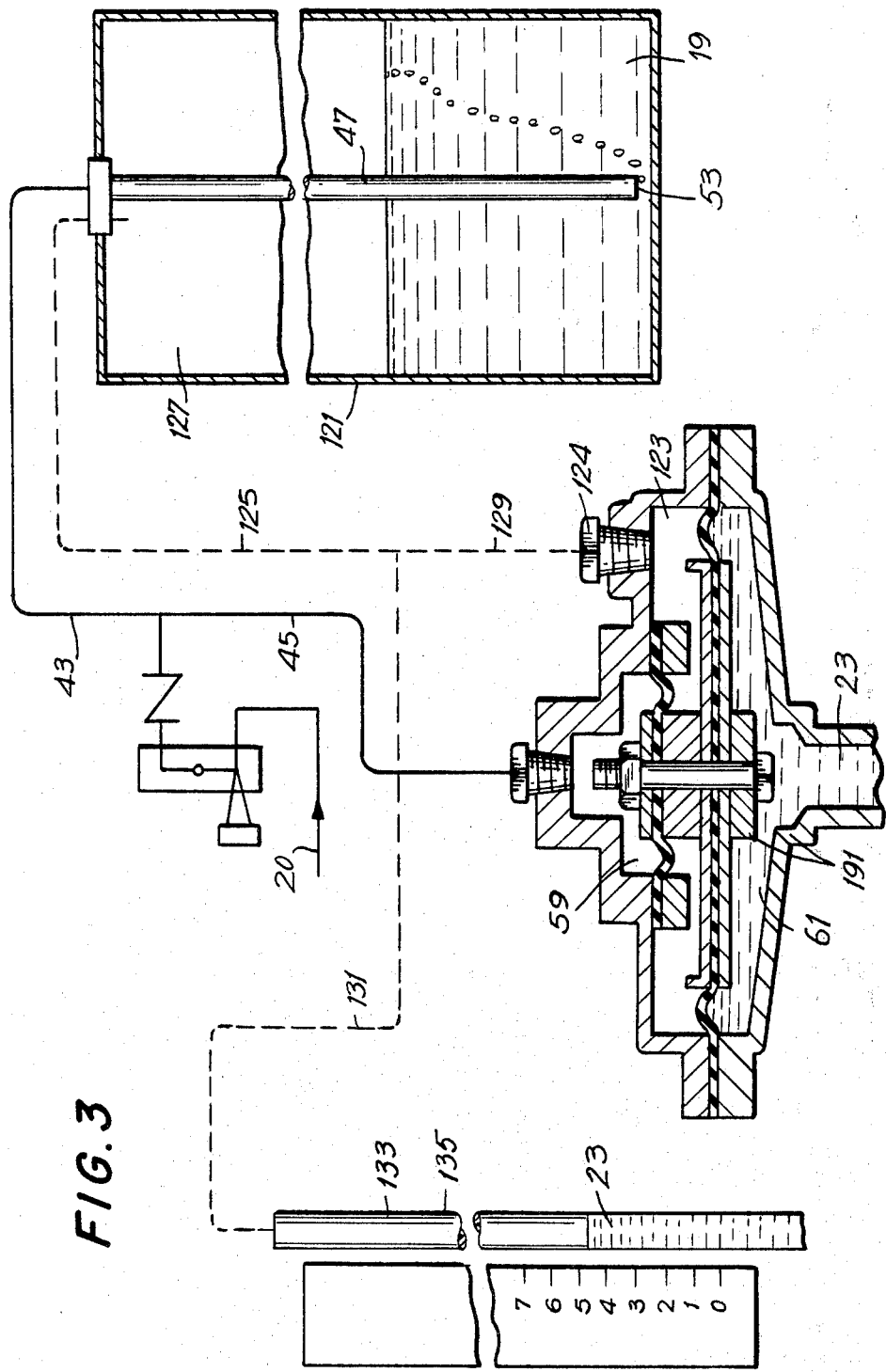
FIG. 3 is a schematic view of the system as used to measure sealed tanks illustrating overliquid pressure neutralizing lines.
Figure 4:
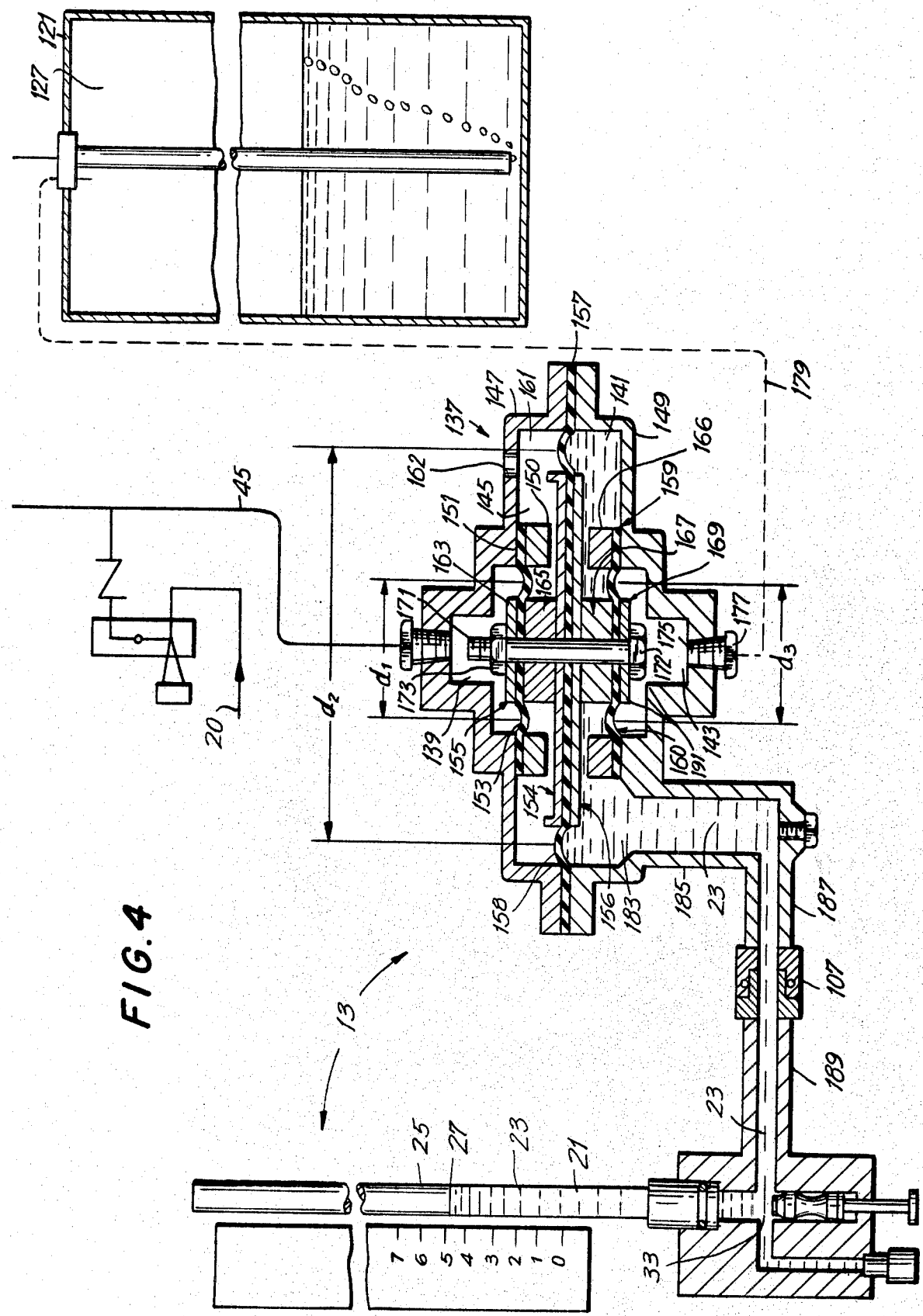
FIG. 4 is a schematic view of the system showing an alternative three-diaphragm pressure converting device for use with sealed tanks.

Pressure converting device 11 has three preferred configurations, one as shown in FIG. 2 for use in tanks open to the atmosphere; a second as shown in FIG. 3 for use in tanks sealed to the atmosphere; and a third as shown in FIG. 4 also for use in tanks sealed to the atmosphere.

In accordance with the subject invention and as illustrated in the schematic layout of FIG. 2, device 11 is constructed and arranged to measure the depth of liquid in an open tank as follows. A first closed, or sealed, chamber 59 and a second closed, or sealed, chamber 61 are contained by body, or housing, 62 which is preferably substantially circular in configuration when viewed from the top, as shown in FIG. 1, as are chambers 59 and 61. Body 62 includes upper body shell 63 and lower body shell 64. Shells 63 and 64 are preferably made of corrosion resistant metal, such as aluminum casting. The particular metal, however, depends upon the type of liquids that will come into contact with the casting. This also applies generally to the gauge and the connecting piping herein described. Shells 63 and 64 are connected around peripheral flange 66 with bolts 68 (see FIG. 1). The first chamber is formed by the walls of upper shell 63 and first diaphragm 65 and the second chamber is formed by the walls of lower shell 64 and second diaphragm 67, which opposes the first diaphragm. Flexible first diaphragm roll 69 is positioned around the periphery of first diaphragm 65, and flexible second diaphragm roll 71 is positioned around the periphery of second diaphragm 67. First roll 69 is curved downwards away from the gas pressure in the first chamber and second roll 71 is curved upwards away from the gauge fluid pressure in the second chamber in order to give flexibility to the diaphragms and to prevent reversals in the directions of the curves in directions because of pressure changes. Both first and second diaphragms are preferably substantially circular in configuration when viewed from the top as their outer circumferences are formed by substantially circular upper and lower shells 63 and 64. The outer circumference of first diaphragm 65 is held in position to body 62 between upper shell 63 and circular fastener 73, which is connected to upper shell 63 by bolts 75, illustrated in FIG. 1. The central portion of diaphragm 67 is held in position by spacer support member 77, which rigidly connects first and second diaphragms 65 and 67. Spacer support member 77 insures a space between the first and second chambers, supports the centers of the diaphragms and, as will be described, transmits forces between the first and second diaphragms. Spacer support member 7 as illustrated in FIG. 2 has three separate portions: top ring 79, middle support ring 81, and bottom ring 83, all connected by vertical through-bolt 85 having head 87 and tightening nut 89. The central portion of the first diaphragm is clamped between top ring 79 and middle support 81.

First diaphragm 65 has a first effective area $A_1$ which is calculated by its measured effective diameter, $D_1$, as illustrated in FIG. 2, which is measured from the midpoints of first roll 69 across the center of the diaphragm and support 77. Area $A_1$ is preferably substantially circular and is located on a plane substantially transverse to spacer support 77.

The term effective area as used herein refers to the sum of the areas across the diaphragm that can be equated with a single plane, since a major portion of the moving portion of the diaphragm includes spacer support member 77 having bolt and nut configurations that interrupt any continuous plane of the diaphragm. Thus, any portion of the spacer support that would receive and transmit a force transverse to the diaphragm that would result in diaphragm movement is part of the effective area (or effective diameter as a result) of the diaphragm.

The central portion of second diaphragm 67 is fixed between plates 91 and 93, which in turn are clamped between middle support 81 and bottom ring 83 of spacer support member 77. Bolt 85 passes through the centers of both spacer support member 77 and first and second diaphragms 65 and 67. The outer circumference of second diaphragm 67 is attached to body 62 by clamping action between upper and lower shells 63 and 64.

Second diaphragm 67 is also preferably circular in configuration when viewed from the top and as defined by attachment to the periphery of body 62 and has a measured effective diameter $D_2$ larger than $D_1$, $D_2$ being measured from the midpoints of second roll 71 across the center of the diaphragm and spacer support 77. Second area $A_2$ is preferably substantially circular and is located on a plane substantially transverse to spacer support 77 and substantially parallel to the plane of area $A_1$.

The first and second diaphragms are preferably made of any flexible substance such as rubber.

Lower body shell 64 forms the outer wall and second diaphragm 67 forms the inner wall of second chamber 61, which is sealed except for outlet 97 which is illustrated as being directly under spacer support member 77 but may be positioned at any convenient location.

Vertical pipe 57 connects to outlet 97 of sealed chamber 61 and horizontal pipe 56 is connected to vertical pipe 57. While pipes 56 and 57 are illustrated as being integral with shell 64 such is not necessarily required. Plug 103 at the bottom of vertical pipe 57, when removed, frees passage 104 for draining the device 11 or for filling it with gauge fluid. Horizontal pipe 56 in turn is joined to horizontal pipe leg 55, which is extended from the bottom of column 21 at gauge block 35 and provides passage for gauge fluid 23 to pipe 56, pipe 57, and second chamber 61.

In order to fill second chamber 61 with gauge fluid, device 11 is turned upside down via swivel coupling 107 mounted between horizontal pipes 55 and 56, and then filled with gauge fluid at passage 104. This procedure eliminates the possibility of an air pocket forming in the second chamber and insures that the second chamber will be completely filled with gauge fluid. In this upside down position, first and second diaphragms 65 and 67 with attached spacer support member 77, which are free to move in unison within body 62, are moved by the pressure of the gauge fluid downwards away from the filling passage 104 as the fluid fills the second chamber. In the event this function is performed in preparation for shipment of the apparatus, piston sealing valve 109 located in block 35 at the bottom of column 21 is moved inward so as to block the passage of gauge fluid through pipe leg 55 and thereby keeps the gauge fluid from entering cylinder 25. Because of the flexion of the two diaphragms, sufficient gauge fluid is contained in the second chamber to accommodate the gauging cylinder and allow a proper column of gauge fluid to enter the cylinder once device 11 is righted and valve 109 is opened and the gauge fluid in the second chamber is allowed to leave the chamber. When this is accomplished, the second chamber is left with sufficient gauge fluid in the righted position to enter the gauge, since the second diaphragm has fallen downward towards the second chamber; and gauge fluid exerts hydrostatic pressure against the second diaphragm in the righted position without any gauge fluid being added.

Second chamber 61 is elevationally positioned between gauge fluid level 27 in cylinder 25 and bottom 33 of column 21 of the gauging liquid in order for the correct hydrostatic pressure to be applied within the chamber.

Column 21 creates a hydrostatic pressure and this hydrostatic pressure passes to second chamber 61 where it presses at the unit pressure against the second effective area, $A_2$, of second diaphragm 67. This pressure is relatively low, since lightweight gauge fluid is used and the gauge cylinder is kept to the normal height as when heavyweight gauge liquids are used.

A third chamber 111 is formed between first and second chambers 59 and 61 by upper shell 63, first diaphragm 65, and second diaphragm 67. Middle support 81 of spacer support 77 defines the vertical dimension of chamber 111. Bore 113 vents third chamber 111 to the atmosphere, as shown in FIGS. 1 and 2.

In operation, stored liquid 19 in tank 17, which is open to the atmosphere, exerts a pressure at the level of the open end 53 of downpipe 47. After purging of the stored liquid from the downpipe by the compressed gas, when gas bubbles 54 emerge from the downpipe, the pressure of the gas supply stabilizes at a particular pressure that directly reflects the hydrostatic pressure exerted by the stored liquid at the level of the bottom of the downpipe. This pressure, which, as noted earlier, will be referred to here as the hydrostatic pressure exerted by the height of stored liquid in the tank, is simultaneously transferred via compressed gas transmission line 45 to device 11, in particular to gas connector 46 which connects line 45 to first chamber 59.

The pressure of the gas in the first chamber exerts a first pressure, $P_1$, on the confining walls of the chamber including first diaphragm 65, and in particular, on effective first area $A_1$, described earlier in detail. A first force, $F_1$, which is equal to the first pressure times the first effective area, that is, $F_1 = P_1 \times A_1$, is exerted via spacer support 77 to second diaphragm 67.

Simultaneously, a hydrostatic pressure is exerted by column 21, the magnitude of which is a function of the height of column 21 of gauge fluid. The pressure is of course also a function of the specific gravity of the lightweight gauge fluid. This pressure is exerted through horizontal pipe leg 55, horizontal pipe 56 and vertical pipe 57 to the gauge fluid filling the second chamber to capacity where the pressure is exerted against the walls of the second chamber including second diaphragm 67 and in particular second effective area $A_2$ described previously. A second force $F_2$, equal to the second unit pressure times the second effective area, that is, $F_2 = P_2 \times A_2$, is exerted via spacer support member 77 to first diaphragm 65. Because the first and second planes on which forces $F_1$ and $F_2$ act against are parallel and are perpendicular to spacer support 77 and act in opposition to one another, the movement of the spacer support and therefore of first and second diaphragms 65 and 67 will cease when forces $F_1$ and $F_2$ balance one another. In particular, when the level of the liquid in the tank falls, $F_2$ will be greater than $F_1$ and the level of the gauge liquid will fall to a new position where it will stabilize $F_1 = F_2$. And when the level of the liquid in the tank rises, $F_1$ will be greater than $F_2$ and the level of the gauge liquid will rise to a new position where it will stabilize when $F_1 = F_2$. The movement of the two diaphragms in the direction of the greater force is allowed by the flexible roll portions 69 and 71 while the movement of the diaphragms is kept in unison by the spacer support member 77, which also performs the function of transferring forces $F_1$ and $F_2$ between the diaphragms.

The above description of the working of device 11 can be analyzed also as a reduction of the tank hydrostatic liquid pressure $P_1$ exerted in the first chamber to the hydrostatic gauge pressure $P_2$ exerted in the second chamber. The proportion of the reduction is that of the ratio of effective area $A_1$ to effective area $A_2$. Also, in the other direction, there is an increase of the gauge fluid hydrostatic pressure $P_2$ to the tank liquid hydrostatic pressure $P_1$, which proportion of increase is that of the ratio of effective area $A_2$ to effective area $A_1$.

Gauge portion 29 is calibrated according to the specific gravity of the gauge fluid and the storage liquid, and the relative proportions of $A_1$ and $A_2$. (Calibration must take into account distance 49 between open end 53 of the downpipe and the bottom 51 of the tank).

Device 11 is constructed and arranged to perform two conversions. It translates the greater hydrostatic pressure of the store liquid into a first force to match the second force exerted by the lesser hydrostatic pressure of the gauge liquid. Alternatively stated, device 11 has the function of translating the lesser hydrostatic pressure exerted by the gauge liquid into a second force to match the first force exerted by the greater pressure of the stored liquid. Thus, if the stored liquid exerts a $P_1$ of 3 psi, and if $A_1$ is 10 sq. in., $F_1 = 3 \times 10 = 30$ pounds. And if the gauge liquid exerts a $P_2$ of 0.5 psi and $A_2$ is 60 sq. in., $F_2 = 0.5 \times 60 = 30$ pounds. Thus $F_1$ and $F_2$ balance one another.

Stated differently, if $F_1 = F_2$, then $P_1 A_1 = P_2 A_2$, or $P_1 = P_2(A_2/A_1)$. Thus, device 11 reduces the hydrostatic pressure exerted by the stored liquid to the hydrostatic pressure exerted by the gauge fluid hydrostatic pressure, a result which allows the use of a lightweight gauge fluid when the fluid is displaced upward. Likewise, $P_2 = P_1(A_1/A_2)$, a result which increases the lesser gauge fluid pressure to the greater tank liquid pressure when the gauge fluid column falls.

A variation of the apparatus of the subject invention is necessary when the tank containing the stored liquid is sealed and either a positive or negative pressure relative to atmospheric pressure is present in the overliquid portion of the tank. In such a case, the overliquid pressure must be accounted for in determining the true height of liquid in the tank.

In accordance with the embodiment of the subject invention illustrated in FIG. 3, device 11 is adapted to equalize, or neutralize, the positive or negative pressure in the overliquid portion of the tank. Tank 121 with sealed overliquid portion 127 contains stored liquid 19 and has downpipe 47 extending to open end 53. A third sealed chamber 123 is formed between first and second chambers 59 and 61 by means of sealing venting bore in third open chamber 11 with sealed connector 124. Pressure equalizing, or neutralizing, line 125 connects overliquid portion 127 of the sealed tank through first branch equalizing line 129 to connector 124 at third chamber 123. Second branch line 131, which extends from pressure equalizing line 125, connects the overliquid portion 127 of the tank with the overfluid portion 133 of gauge cylinder 135, which is sealed from the atmosphere. Positive or negative pressure in overliquid portion 127 of the sealed tank is compensated by the pressure equalizing connections to third sealed chamber 123 and sealed overfluid portion 133 of the gauge cylinder. This compensation is explained as follows.

Assumptions of the prior example will be used, namely, first effective area $A_1 = 10$ sq. in.; second effective area $A_2 = 60$ sq. in.; hydrostatic gauge fluid pressure area $A_2 = 60$ sq. in.; hydrostatic storage liquid pressure $P_1 = 3$ psi; hydrostatic gauge fluid pressure $P_2 = 0.5$ psi. Also, $F_1$ is the downforce in device 11 at the first chamber, $F_2$ is the upforce at the second chamber, $F_3$ is the downforce at the third chamber, and $F_4$ is the upforce at the third chamber. A further assumption is a tank overliquid pressure (over atmospheric) of 5 psi. Finally $A_s$ is the cross-sectional area of spacer support 77. These assumptions establish the following:

$$F_1 = (5 \text{ psi} + 3 \text{ psi}) \times (10 \text{ sq. in.}) = 80 \text{ lbs.}$$

$$F_2 = (0.5 \text{ psi} + 5 \text{ psi}) \times 60 \text{ sq. in.} = 330 \text{ lbs.}$$

$$F_3 = 5 \text{ psi } (60 \text{ sq. in.} - A_s) = (300 - 5A_s) \text{ lbs.}$$

$$F_4 = 5 \text{ psi } (10 \text{ sq. in.} - A_s) = (50 - 5A_s) \text{ lbs.}$$

In summary, the upforces and downforces balance as follows:

$$F_1 + F_3 = F_2 + F_4$$

$$80 + 300 - 5A_s = 330 + 50 - 5A_s$$

$$380 - 5A_s = 380 - 5A_s$$

Thus the pressure equalizing lines and the third sealed chamber cause a positive pressure in the overliquid portion of the tank to cancel out.

In the case of a negative pressure, that is, a vacuum, the same reasoning applies. Using absolute values for purposes of clarity of example, the following example is given:

Assume a relative pressure of −5 psi in the overliquid portion of the tank. With the assumption of a 15 psi atmospheric pressure, an absolute pressure of 10 psi exists in the overliquid portion of the tank. Adding 3 psi hydrostatic pressure, a pressure of 13 psi absolute is transferred to the first chamber. Also 10 psia is transferred to the gauge overfluid portion and third chamber 123. The resulting forces would be as follows:

$$F_1 = 13 \text{ psia} \times 10 \text{ sq. in.} = 130 \text{ lbs.}$$

$$F_2 = 10.5 \text{ psia} \times 60 \text{ sq. in.} = 630 \text{ lbs.}$$

$$F_3 = 10 \text{ psia } (60 \text{ sq. in.} - A_s) = (600 - 10A_s) \text{ lbs.}$$

$$F_4 = 10 \text{ psia } (10 \text{ sq. in.} - A_s) = (100 - 10A_s) \text{ lbs.}$$

In summary, the upforces and the downforces balance as follows:

$$F_1 + F_3 = F_2 + F_4$$

$$130 + 600 - 10A_s = 630 + 100 - 10A_s$$

$$730 - 10A_s = 730 - 10A_s$$

Thus, the pressure equalizing lines and the third sealed chamber cause a negative pressure in the overliquid portion of the tank to cancel out.

An alternative embodiment of the subject invention for equalizing, or neutralizing, positive or negative pressure in the overliquid portion of a sealed tank is illustrated in FIG. 4. This embodiment has the advantage of insuring that the gauge liquid and/or the stored liquid do not contaminate each other. In general, this is accomplished by adding a third diaphragm with a third effective area parallel to the first effective area of the first diaphragm.

In particular, FIG. 4 illustrates device 11 comprising housing 137, which is preferably substantially circular in top view similar to FIG. 1, forming three sealed chambers and one vented chamber, namely, gas chamber 139, gauge liquid chamber 141, pressure equalizing chamber 143, and vented chamber 145. Housing 137 includes top shell 147 and lower shell 149. Gas chamber 139 is formed by the walls of top shell 147 and substantially circular first diaphragm 151 (which is analogous to first diaphragm 65 of FIG. 2) with first ring roll 153. Upper diaphragm 151 has a first effective diameter, $d_1$, which is measured on a plane from the center of its ring roll 153 around its periphery through the center of spacer support 155 on which the central portion of the upper diaphragm is affixed. The diameter $d_1$ is measured across a first plane perpendicular to spacer support member 155 and is the basis for calculation of the first effective area, $a_1$. As in FIG. 2, the periphery of the diaphragm adjacent to first roll 153 is held in position by inner mounting ring 150 connected to the top shell by bolts (similar to bolts 75 of FIG. 1), while the center portion of the first diaphragm is held in position by spacer support member 155.

Spacer support member 155 is analagous in function to spacer support member 77 of FIG. 2, namely, to separate one diaphragm from the other, to support the centers of the diaphragms, and to pass forces from one diaphragm to another. Spacer support member 155 moves freely within body 137 and is restrained by the flexible limits of the three diaphragms (although an optional stop means is disclosed below). Spacer support member 155 has an added element and includes the following elements: upper ring 163, upper middle support 165, lower middle support 167, and lower ring 169, each mounted one to the other in the order named with bolt 171 mounted through the center of each element with head 172 and nut 173 holding the elements in position.

FIG. 4 also shows substantially circular middle diaphragm 157 with peripheral ring roll 158. The middle diaphragm is supported in its center portion by upper and lower plates 154 and 156 in a similar manner to the plates of FIG. 2. Plates 154 and 156 are supported and gripped by support 155 between upper support 165 and lower support 167. The middle diaphragm is clamped around its periphery adjacent to second roll 158 by top and bottom shells 147 and 149 which are held by bolts (not shown) similar to flange bolts 68 of FIG. 1.

Vented chamber 161 is formed between the upper and middle diaphragms 151 and 157 and the walls of the top shell 147. Vent 162 in the wall of top shell 147 allows ingress and egress of atmospheric air to the vented chamber.

Middle diaphragm 157 has second effective diameter $d_2$ measured from the center of roll 158 across the center of support 155 on a plane parallel to the plane of $a_1$ and which is the diameter of second effective area $a_2$.

Substantially circular lower diaphragm 159 with ring roll 160 formed around its periphery is mounted at its center portion by spacer support member 155 between lower middle support 167 and lower ring 169 and at its outer edge by lower shell 149 and inner mounting ring 166 which are connected by bolts (not shown). Lower diaphragm 159 has effective diameter $d_3$ measured from the center of its roll 160 across the center of support 155 on a plane parallel to the planes of $a_1$ and $a_2$ and which is the diameter of third effective area $a_3$.

The terms upper, middle, lower are used in reference to the embodiment of FIG. 4 for purposes of exposition, and are not meant to indicate that these positions are absolute and cannot be varied.

First and third effective areas $a_1$ and $a_3$ are equal in area and are formed on substantially parallel planes. Second effective area $a_2$ is greater in area than $a_1$ and $a_2$ by a known proportion and is formed on a plane parallel to the planes of $a_1$ and $a_3$. Thus, forces directed against the three diaphragms are directed in support of or opposition to one another. All three diaphragms move in unison along with spacer support 155, which transfers the forces, within body 137.

Gauge fluid chamber 141 is formed by the wall of lower shell 149 and middle and lower diaphragms 157 and 159. Chamber 141 is filled to capacity by gauge fluid 23 and is positioned to receive the hydrostatic unit pressure exerted by the bottom of column 21 of the gauge liquid, namely, below gauge liquid level 27 and bottom 33 of column 21.

Pressure equalization, or neutralizing, chamber 143 is formed by the wall of lower shell 149 and lower diaphragm 159 and has outlet 175 in lower shell 149 having connector 177. Pressure equalizing line 179 connects outlet 175 via connector 177 with overliquid portion 122 of sealed tank 121. (It is noted that, unlike FIG. 3, the overliquid portion of the gauge cylinder for the variation illustrated in FIG. 4 is open to the atmosphere.)

Gauge fluid chamber 141 has outlet 183 that is preferably located at the periphery of the chamber and is connected to vertical pipe 185 that in turn is connected to horizontal pipe 187 and thus to gauging cylinder 25 and bottom 33 of column 21. Swivel coupling 107 joins horizontal pipe 187 and horizontal pipe leg 189.

Positive or negative pressure in overliquid portion 127 of the sealed tank is added to or subtracted from the hydrostatic pressure of the stored liquid as transmitted to gas chamber 139 via gas transmission line 45. Simultaneously, the positive or negative pressure in the overliquid portion is simultaneously transferred to pressure equalizing chamber 143 via line 179. The positive and negative pressures present in the upper and lower chambers cancel each other out since they are being applied simultaneously in opposite directions via support 155 and the upper and lower diaphragms by way of their first and third effective areas.

Figure 5:
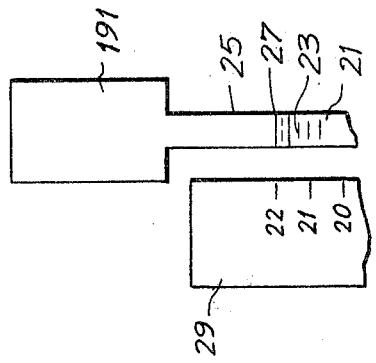
FIG. 5 is a schematic view of the overflow reservoir of the gauging cylinder.

Overflow loss of the gauge fluid is prevented in two ways. First, FIG. 5 illustrates gauge cylinder 25 having gauge fluid column 21 with level 27. Positioned over cylinder 25 is overflow fluid reservoir 191, which is adapted to receive any excess gauge fluid 23.

Alternatively, the lower wall of second chamber 61, and the lower portion of spacer support member 77 (or 155) specifically bottom ring 83, are constructed and arranged to meet at a ringed stop 191 beyond which the spacer support member 77 will not pass, thus limiting the amount of gauge liquid 23 which can be displaced into gauge cylinder 25. The stop is illustrated in FIGS. 2, 3, and 4.

With the pressure converting device of the subject invention, a lightweight gauge liquid or normal column height can be used. The gauge liquid selected should normally have the properties of being non-evaporative, non-corrosive, and relatively non-toxic. Such liquids include anti-freeze, that is, ethylene glycol, which has a specific gravity slightly over one, and transmission oil, which has a specific gravity of about 0.9.

While there is herein shown and described the preferred embodiment of the invention, it will be understood that the invention may be embodied otherwise than as herein specifically illustrated or described, and that in the illustrated embodiments certain changes in the details of construction and in the form and arrangement of parts may be made without departing from the underlying idea or principles of this invention within the scope of the appended claims.

Having thus described our invention, what we claim and desire to secure by letters patent is:

1. A system for measuring the level of a stored liquid in a tank comprising:
   (a) means for providing a pressure proportional to the tank hydrostatic pressure exerted by said stored liquid,
   (b) means for altering said pressure by a predetermined ratio to an altered pressure,
   (c) means for transmitting said altered pressure to a column of gauge fluid so as to displace said column to a level proportional to said altered pressure,
   (d) said column being calibrated so as to provide a reading corresponding to said level, whereby the altering of said pressure permits the use of a lightweight, relatively non-toxic gauge fluid,
   (e) said means for altering said pressure including a housing having opposite ends, and a pair of opposed diaphragms secured to each other in fixed spaced relation provided in said housing, said diaphragms defining with said housing a first chamber between the first of said diaphragms and one of said housing ends and a second chamber between the second of said diaphragms and the other of said housing ends,
   (f) said means for providing a proportional pressure being connected to said first chamber, and
   (g) said altered pressure being transmitted from said second chamber to said column.

2. A system in accordance with claim 1, wherein
   (a) said second diaphragm is larger in area than said first diaphragm by said predetermined ratio,
   (b) whereby said proportional pressure provided to said first chamber is reduced by said ratio to said altered pressure.

3. A system in accordance with claim 2, wherein
   (a) said pair of diaphragms are rigidly secured to one another in fixed spaced relation by a member,
   (b) said member having said pair of diaphragms movable in unison relative to said housing in response to said proportional pressure exerted against said first diaphragm,
   (c) whereby said member transmits said proportional pressure from said first diaphragm to said larger second diaphragm, and said proportional pressure is reduced to said altered pressure in said second chamber.

4. A system in accordance with claim 3, wherein
   (a) said tank has an overliquid portion sealed from the atmosphere exerting a positive or negative overliquid pressure relative to atmospheric pressure,
   (b) said first and second diaphragms defining with the sides of the housing a third chamber positioned between said first and second chambers,
   (c) a sealed gauge overfluid portion is provided at the top of said column of gauge fluid,
   (d) said overliquid portion of said tank is connected to both said third chamber and to said gauge overfluid portion, and
   (e) whereby said overliquid pressure is neutralized and said column of gauge fluid is displaced to a level allowing a direct gauge reading corresponding to the level of liquid in the tank.

5. A system in accordance with claim 1, further including a stop means for limiting the quantity of gauge fluid displaced from said second chamber.

6. In a system for measuring the level of a stored liquid in a tank wherein a pressure proportional to the tank hydrostatic pressure exerted by said stored liquid is adapted to be transmitted to a column of gauge fluid so as to displace said column in response to said proportional pressure, the improvement comprising means interposed between the tank and said column for altering said proportional pressure by a predetermined ratio to an altered pressure adapted to be transmitted to said column whereby a low density, relatively non-toxic fluid can be used in the gauge column, said means interposed between the tank and the column for altering said pressure including (a) a housing having opposite ends, and
(b) a pair of opposed diaphragms secured to each other in fixed spaced relation provided in said housing,
(c) said diaphragms defining with said housing a first chamber between the first of said diaphragms and one of said housing ends and a second chamber between the second of said diaphragms and the other of said housing ends,
(d) said proportional pressure being adapted to be connected to said first chamber, and
(e) said altered pressure being adapted to be transmitted from said second chamber to said column.

7. The invention in accordance with claim 6, wherein
(a) said second diaphragm is larger in area than said first diaphragm by said predetermined ratio,
(b) whereby said proportional pressure adapted to be provided to said first chamber is reduced by said ratio to said altered pressure.

8. The invention in accordance with claim 7, wherein
(a) said pair of diaphragms are rigidly secured to one another in fixed spaced relation by a member,
(b) said member having said pair of diaphragms movable in unison relative to said housing in response to said proportional pressure exerted against said first diaphragm,
(c) whereby said member transmits said proportional pressure from said first diaphragm to said larger second diaphragm, and said proportional pressure is reduced to said altered pressure in said second chamber.

9. A system for measuring the level of a stored liquid in a tank comprising
(a) means for providing a pressure proportional to the tank hydrostatic pressure exerted by said stored liquid,
(b) means for altering said pressure by a predetermined ratio to an altered pressure,
(c) means for transmitting said altered pressure to a column of gauge fluid so as to displace said column to a level proportional to said altered pressure,
(d) said column being calibrated so as to provide a reading corresponding to said level, whereby the altering of said pressure permits the use of a lightweight, relatively non-toxic gauge fluid,
(e) said tank having an overliquid portion sealed from the atmosphere and which exerts a positive or negative overliquid pressure relative to atmospheric pressure,
(f) said means for altering said pressure including a housing having opposite ends, three diaphragms secured to one another in fixed spaced relation provided in said housing, said diaphragms defining with said housing a first chamber between the first of said diaphragms and one of said housing ends, a second chamber between the second of said diaphragms and the other of said housing ends, and a third chamber defined by the third of said diaphragms, said second diaphragm, and the sides of said housing, said third diaphragm being positioned between and opposed to said first and second diaphragms,
(g) said means for providing a proportional pressure being connected to said first chamber, and said proportional pressure including the overliquid pressure,
(h) said altered pressure being transmitted from said third chamber to said column, and
(i) said overliquid pressure being transmitted from said tank overliquid portion to said second chamber,
(j) whereby said overliquid pressure is neutralized and said column of gauge fluid is displaced to a level allowing a direct gauge reading corresponding to the level of liquid in the tank.

10. A system in accordance with claim 9, wherein
(a) said first and second diaphragms are equal in area,
(b) said third diaphragm is larger in area than said first and second diaphragms by said predetermined ratio,
(c) whereby said proportional pressure provided to said first chamber is reduced by said ratio to said altered pressure to said third chamber.

11. A system in accordance with claim 10, wherein
(a) said three diaphragms are rigidly secured to one another in fixed spaced relation by a member,
(b) said member moving said three diaphragms in unison relative to said housing in response to said proportional pressure exerted against said first diaphragm,
(c) whereby said member transmits said proportional pressure from said first diaphragm to said larger third diaphragm, and said proportional pressure is reduced to said altered pressure in said third chamber.

12. A system in accordance with claim 9, further including a stop means for limiting the quantity of gauge fluid displaced from said third chamber.

13. A system for measuring the level of a stored liquid in a tank comprising, means for providing a pressure proportional to the tank hydrostatic pressure exerted by said stored liquid, means for altering said pressure by a predetermined ratio to an altered pressure, means for transmitting said altered pressure to a column of gauge fluid so as to displace said column to a level proportional to said altered pressure, said column being calibrated so as to provide a reading corresponding to said level, whereby the altering of said pressure permits the use of a lightweight, relatively non-toxic gauge fluid, said means for altering said pressure including (a) a housing containing first and second sealed chambers,
(b) said first chamber being joined to said means for providing pressure and having a first diaphragm, said pressure being exerted against said first diaphragm,
(c) said second chamber being joined to the bottom of said column of gauge fluid and having a second diaphragm, a hydrostatic gauge fluid pressure being exerted against said second diaphragm, said second diaphragm opposing and being proportionally larger in area than said first diaphragm, and
(d) a member rigidly connecting and separating said first and second diaphragms, said member being movable relative to said housing,
(e) said first diaphragm being movable relative to said housing in response to said pressure exerted via said first chamber, and in response to other pressure received from said second diaphragm exerted via said member, (f) said second diaphragm being movable relative to said housing in response to said gauge fluid hydrostatic pressure exerted via said second chamber, and in response to said pressure received from said first diaphragm exerted via said member.

14. A system for measuring the level of a stored liquid in a tank comprising, means for providing a pressure proportional to the tank hydrostatic pressure exerted by said stored liquid, means for altering said pressure by a predetermined ratio to an altered pressure, means for transmitting said altered pressure to a column of gauge fluid so as to displace said column to a level proportional to said altered pressure, said column being calibrated so as to provide a reading corresponding to said level, whereby the altering of said pressure permits the use of a lightweight, relatively non-toxic gauge fluid, said tank having an overliquid portion sealed from the atmosphere exerting a tank overliquid pressure that is positive or negative relative to atmospheric pressure, said means for altering including, (a) a housing containing first, second and third sealed chambers, (b) said first chamber being joined in said means for providing a proportional pressure and having a first diaphragm, said pressure being exerted against said first diaphragm, (c) said second chamber being joined to the bottom of said column of gauge fluid and having a second diaphragm, a hydrostatic gauge fluid pressure being exerted against said second diaphragm, said second diaphragm opposing and being proportionally larger in area than said first diaphragm, and (d) said third chamber being positioned between said first and second diaphragms and being joined to said tank overliquid portion, (e) a member rigidly connecting and separating said first and second diaphragms, said member being movable relative to said housing, (f) a sealed gauge overfluid portion provided at the top of said column of gauge fluid, (g) means for connecting said gauge overfluid portion to said tank overliquid portion, (h) said first diaphragm being movable relative to said housing in response to said pressure and to said tank overliquid pressure exerted via said first chamber, in response to said tank overliquid pressure exerted via said third chamber, and in response to other pressure received from said second diaphragm exerted via said member, (i) said second diaphragm being movable relative to said housing in response to said hydrostatic gauge fluid pressure and to said tank overliquid pressure exerted via said second chamber, in response to said tank overliquid pressure exerted via said third chamber, and in response to other pressure received from said first diaphragm exerted via said member, (j) whereby said tank overliquid pressure is neutralized and said column of gauge fluid is displaced to a level allowing a direct gauge reading of the level of liquid in the tank.

15. A system for measuring the level of a stored liquid in a tank comprising, means for providing a pressure proportional to the tank hydrostatic pressure exerted by said stored liquid, means for altering said pressure by a predetermined ratio to an altered pressure, means for transmitting said altered pressure to a column of gauge fluid so as to displace said column to a level proportional to said altered pressure, said column being calibrated so as to provide a reading corresponding to said level, whereby the altering of said pressure permits the use of a lightweight, relatively non-toxic gauge fluid, said tank having an overliquid portion sealed from the atmosphere exerting a tank overliquid pressure that is positive or negative relative to the atmospheric pressure, said means for altering including (a) a housing containing first, second and third sealed chambers, (b) said first chamber being joined to said means for providing a proportional pressure and having a first diaphragm, said pressure being exerted against said first diaphragm, (c) said second chamber being joined to said tank overliquid portion and having a second diaphragm equal in area to said first diaphragm, (d) said third chamber being positioned adjacent to said second diaphragm and being connected to said bottom of said column of gauge fluid and having a third diaphragm positioned between and opposing said first and second diaphragms, said third diaphragm being proportionally larger in area than said first and second diaphragms, a hydrostatic gauge fluid pressure being exerted against said second and third diaphragms, (e) a member rigidly connecting and separating said first, second and third diaphragms, said member being movable relative to said housing, (f) said first diaphragm being movable relative to said housing in response to said pressure and to said tank overliquid pressure exerted via said first chamber, and in response to other pressure from said second and third diaphragms exerted via said member, (g) said second diaphragm being movable relative to said housing in response to said tank overliquid pressure exerted via said second chamber, to said hydrostatic gauge fluid pressure and to said tank overliquid pressure exerted via said third chamber, and in response to pressure from said first and third diaphragms exerted via said member, (h) said third diaphragm being movable relative to said housing in response to said gauge fluid pressure exerted via said second chamber, and in response to other pressure received from said first and second diaphragms exerted via said member, (i) whereby said tank overliquid pressure is neutralized and said column of gauge fluid is displaced to a level allowing a direct gauge reading of the level of liquid in the tank.

* * * * *